United States Patent [19]

Fleischer

[11] 4,220,351

[45] Sep. 2, 1980

[54] COLLAPSIBLE FRAMES FOR BABY CARRIERS

[76] Inventor: Henry Fleischer, 18 Notch Park Rd., Little Falls, N.J. 07424

[21] Appl. No.: 964,976

[22] Filed: Nov. 30, 1978

Related U.S. Application Data

[62] Division of Ser. No. 759,081, Jan. 13, 1977, abandoned.

[51] Int. Cl.² .............................................. B62B 7/08
[52] U.S. Cl. ................................... 280/647; 280/650
[58] Field of Search ............... 280/642, 643, 644, 647, 280/648, 650

[56] References Cited

U.S. PATENT DOCUMENTS

| | | | |
|---|---|---|---|
| 1,066,034 | 7/1913 | Nauts | 280/650 |
| 1,119,140 | 12/1914 | Diemer | 280/642 |
| 1,204,791 | 11/1916 | Kyle | 280/642 |
| 2,867,448 | 1/1959 | Mandl | 280/642 |

*Primary Examiner*—Robert R. Song

[57] ABSTRACT

A series of related collapsible lightweight frames are provided which are adapted to be used in conjunction with carriers or seats to form strollers, carriages, high chairs, and the like.

6 Claims, 4 Drawing Figures

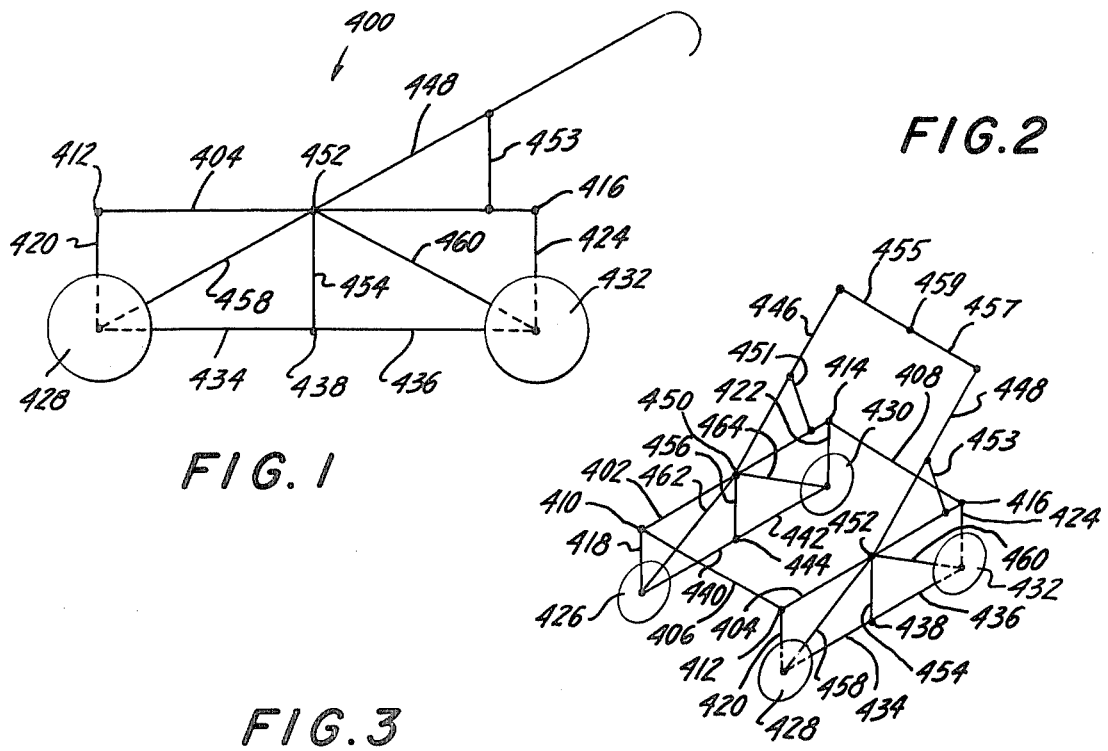
FIG. 1
FIG. 2
FIG. 3
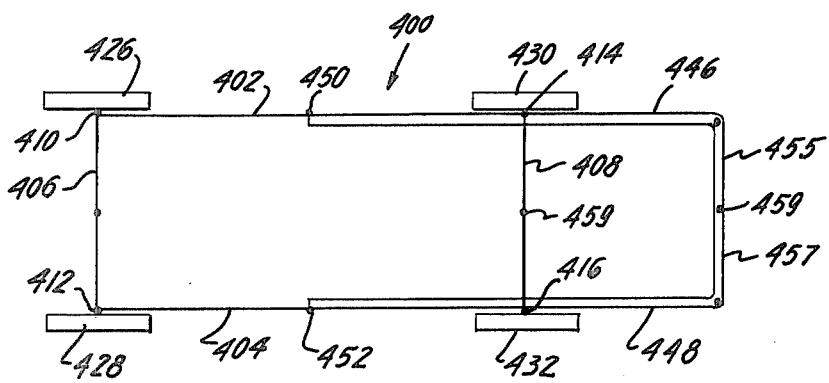
FIG. 4
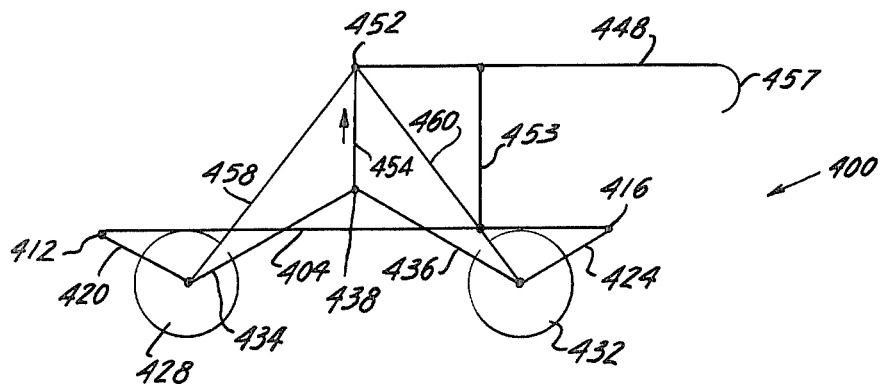

COLLAPSIBLE FRAMES FOR BABY CARRIERS

REFERENCE TO OTHER APPLICATIONS

This application is a divisional application of Ser. No. 759,081, filed Jan. 13, 1977, now abandoned.

FIELD OF THE INVENTION

The present invention relates to collapsible frames for use as strollers, carriages, high chairs and the like adapted to be employed in conjunction with carriers or seats.

BACKGROUND OF THE INVENTION

The choice in child carrying and securing devices and frames existing in the marketplace today is endless. There are many different types of devices and frames serving the same or different functions. Thus, the prospective buyer asks not only what brand of device to buy but whether frames and carriers comprising car beds, car seats, infant seats, youth seats, high chairs, bathinettes, carriages, strollers, walkers, etc. are all actually necessary. Of course, each of these devices plays an important function at one time or another. But where are they all to be stored? How is one able to pay for all of them? Unfortunately, until now, the new parent had no real answers to these questions. These items are necessities so that the parent was required to purchase each device, including frame and carrier, and somehow make the necessary storage room therefor.

The present invention provides a real solution to the problem of providing each of the child holding, carrying and supporting functions discussed above in a manner so as to require a minimum of expense and storage capacity.

BRIEF STATEMENT OF THE INVENTION

In accordance with the present invention, a collapsible frame for a stroller or other type carrier is provided which includes a pair of side support members, a pair of end support members connected to the side support members to form four corners, front and back legs, one of the legs being pivotally connected to and extending downwardly from each of the corners, one or more wheels connected to lower ends of each of the legs, optionally, a pair of wheel side braces, disposed in close proximity to each of the side support members, upper end portions of the wheel side braces being pivotally connected to each other to define an upper side pivot point, and lower end portions of each pair of wheel side braces being connected to a pair of front and back legs, optionally, a pair of lower side members, disposed on each side of the frame, upper end portions of each pair being pivotally connected to each other to define a lower side pivot point, and lower end portions of each pair of lower side members being connected to a pair of front and back legs, a pair of vertical support members one of which is connected to and between an upper side pivot point and a lower side pivot point, a pair of handle support members, each of which is connected to an upper side pivot point, and a pair of handle struts each connected to and between a handle support member and a side support member. Upon applying a downward force on the handle support members, the handle support members lift the upper and lower side pivot points and respective vertical support members thereby causing the front legs and back legs and wheels carried thereby to be lifted upwardly so that the front legs and back legs move toward each other to a collapsed position.

Other variations of the aforedescribed frames are also provided as will be seen hereinafter.

BRIEF DESCRIPTION OF THE ACCOMPANYING FIGURES

FIG. 1 is a side schematic view of a collapsible frame assembly in accordance with the present invention;

FIGS. 2 and 3 are schematic perspective and plan views, respectively, of the frame shown in FIG. 1;

FIG. 4 is a partial side schematic view of the frame of FIGS. 1, 2 and 3 in collapsed position.

Turning now to FIGS. 1, 2, 3 and 4 there is shown a lightweight collapsible carriage or stroller frame indicated generally by the numeral 400. The frame 400 includes side support members 402, 404 connected to end support members 406, 408 as shown to form corners 410, 412, 414 and 416. Legs 418, 420, 422 and 424 are pivotally connected at corners 410, 412, 414 and 416, respectively, the legs being connected to one or more wheels 426, 428, 430 and 432, respectively, as shown. Side braces 434 and 436 are connected to legs 420 and 424, respectively, the braces 434 and 436 being pivotally connected to each other at pivot point 438, while side braces 440 and 442 are connected to legs 418 and 422, respectively, the braces 440 and 442 being pivotally connected to each other at pivot point 444.

Handle support members 446,448 are pivotally connected via pivots 450,452, respectively, to control struts 456,454, respectively, the control struts 456,454 also being pivotally connected at pivots 444,438, respectively, as shown. The handle support members 446,448 are supported by means of vertically disposed struts 451,453 connected between the handle support members 446,448 and the side support members 402,404, respectively, as shown.

The handle support members are pivotally connected at their upper ends to handle sections 455, 457 which in turn are pivotally connected to each other via pivot 459.

If desired, cross support struts 458, 460 may be used to connect up pivot 452 to legs 420 and 424, respectively, while cross support struts 462, 464 may be used to connect up pivot 450 to legs 418, 422, respectively.

The frame 400 may be collapsed from its open position (FIGS. 1, 2, 3) to its closed position (FIG. 4) by simply applying a downward force on handle 455, 457 and handle support members 446, 448 which in turn causes control struts 454, 456 to move upwardly and thereby lift pivots 438, 444 which in turn cause side braces 434, 440 and 436, 442 to be lifted upwardly carrying wheels 426, 428 and 430, 432 inwardly and upwardly toward each other to the position shown in FIG. 31.

The end members 406, 408 may include pivots intermediate corners 410, 412, 414, 416 which pivots may be moved inwardly towards each other thereby causing side members 402, 404 to be moved inwardly to the collapsed position while the pivot 459 connecting handle sections 455, 457 is moved downwardly toward the rest of frame 400.

In order to open the frame 400 from its collapsed position, the handle sections 455, 457 are lifted upwardly thereby causing the control struts 454, 456 to move downwardly swinging the legs and wheels back to their normal operating position. The end members 406, 408 and handle sections 455, 457 may then be maneuvered to their normal operating positions.

What is claimed is:

1. A collapsible frame comprising, in combination, a pair of side support members, a pair of end support members connected to said side support members to form four corners, front and back legs, one of said legs being pivotally connected to and extending downwardly from each of said corners, one or more wheels connected to lower ends of each of said legs, a pair of wheel side braces, disposed in close proximity to each of said side support members, upper end portions of each pair of said wheel side braces being pivotally connected to each other to define a side pivot point, and lower end portions of each pair of wheel side braces being connected to a pair of front and back legs, a pair of handle support members, each one of which is connected to a side pivot point, and a pair of handle struts each connected to and between a handle support member and a side support member, whereby upon applying a downward force on said handle support members, said side pivot points are lifted causing each of said pair of wheel side braces to be lifted thereby causing the front legs and back legs and wheels carried thereby to be lifted upwardly so that said front and back legs move toward each other to a collapsed position.

2. The frame as defined in claim 1 wherein each of said end support members include intermediate disposed pivot points whereby said end support members may be collapsed inwardly, outwardly, upwardly or downwardly.

3. The frame as defined in claim 1 further including two handle sections each pivotally connected, at a lower end, to a handle support member, and pivotally connected to each other at the upper ends thereof.

4. The frame as defined in claim 1 further including lower side members pivotally connected to each other via lower side pivots and to each pair of front and back legs, said lower side pivots being connected via vertical support members to each of said pivot points.

5. A collapsible frame comprising, in combination, a pair of side support members, a pair of end support members connected to said side support members to form four corners, front and back legs, one of said legs being pivotally connected to and extending downwardly from each of said corners, one or more wheels connected to lower ends of each of said legs, lower side members pivotally connected to each other via lower side pivot points and to each pair of front and back legs, a pair of vertical support members one of which is connected to each of said lower side pivot points, a pair of handle support members, each of which is connected to a vertical support member, and a pair of handle struts each connected to and between a handle support member and a side support member, whereby upon applying a downward force on said handle support members, said handle support members lift said lower side pivot points causing the lower side members to be lifted thereby causing the front legs and back legs and wheels carried thereby to be lifted upwardly so that said front legs and back legs move toward each other to a collapsed position.

6. A collapsible frame comprising, in combination, a pair of side support members, a pair of end support members connected to said side support members to form four corners, front and back legs, one of said legs being pivotally connected to and extending downwardly from each of said corners, one or more wheels connected to lower ends of each of said legs, a pair of wheel side braces, disposed in close proximity to each of said side support members, upper end portions of said wheel side braces being pivotally connected to each other to define an upper side pivot point, and lower end portions of each pair of wheel side braces being connected to a pair of front and back legs, a pair of lower side members, disposed on each side of said frame, upper end portions of each pair being pivotally connected to each other to define a lower side pivot point, and lower end portions of each pair of lower side members being connected to a pair of front and back legs, a pair of vertical support members one of which is connected to and between an upper side pivot point and a lower side pivot point, a pair of handle support members, each of which is connected to an upper side pivot point, and a pair of handle struts each connected to and between a handle support member and a side support member, whereby upon applying a downward force on said handle support members, said handle support members lift said upper and lower side pivot points and respective vertical support members thereby causing the front legs and back legs and wheels carried thereby to be lifted upwardly so that said front legs and back legs move toward each other to a collapsed position.

* * * * *